United States Patent [19]

Geiger

[11] 4,359,640
[45] Nov. 16, 1982

[54] CLEAR AIR TURBULENCE DETECTION
[75] Inventor: Allen R. Geiger, Las Cruces, N. Mex.
[73] Assignee: Aero-Geophysical, Inc., El Paso, Tex.
[21] Appl. No.: 238,991
[22] Filed: Feb. 27, 1981

Related U.S. Application Data

[63] Continuation-in-part of Ser. No. 58,505, Jul. 18, 1979, Pat. No. 4,303,862.

[51] Int. Cl.³ .............................................. G01J 1/42
[52] U.S. Cl. .................................... 250/372; 356/342
[58] Field of Search ............... 250/372, 373; 356/342, 356/436; 73/170 R

[56] References Cited

U.S. PATENT DOCUMENTS

| | | | |
|---|---|---|---|
| 3,415,984 | 12/1968 | Frungel | 250/372 |
| 3,856,402 | 12/1974 | Low et al. | 356/342 X |
| 3,931,462 | 1/1976 | Exton | 250/373 X |

OTHER PUBLICATIONS

Kitamura et al., "Laser Radar System for Observing Atmospheric Conditions" Technol. Rep. Osaka Univ. (Japan) vol. 24, No. 1191–1229, Oct. 1974, pp. 545–555.

*Primary Examiner*—Davis L. Willis
*Attorney, Agent, or Firm*—Kramer and Brufsky

[57] ABSTRACT

Apparatus is disclosed for use on an aircraft for detecting clear air turbulence (CAT) and/or wake vortex (WV). In one embodiment of the invention, a beam of light from a continuous wave UV laser scans an area on the aircraft's flight path. A photodetector monitors optical radiation backscattered from the area, providing an intensity-controlling signal for a CRT display. Clear air turbulence is indicated by non-uniformities on the display. In another embodiment of the invention, a pair of beams of light from a pair nitrogen gas pulse UV lasers are arranged to converge at a region in front of the aircraft. The backscattered radiation from the region is monitored for turbulent areas by a receiver which includes a photodetector and which is connected to an oscilloscope where the return pulse amplitude is analyzed. Velocity determinations of the air parcel monitored are made by causing the two beams to scan either horizontally or vertically. In still another embodiment of the invention, a pair of beams of light, one from a nitrogen gas UV pulse laser and the other from a blue dye laser are arranged to converge at a region in front of the aircraft. The backscattered radiation is monitored for turbulent regions by a receiver and oscilloscope combination. Velocity determinations of the air parcel monitored are made by causing the two beams to scan vertically. In a further embodiment of the invention which is used to detect and monitor wake vortex (WV) as well as clear air turbulence (CAT), either a nitrogen gas pulse UV laser of or a multispectral helium cadmium laser is used to generate a light beam which scans an area in front of the aircraft. Backscattered radiation or the presence of wake vortex is detected by a receiver which includes a slaved image orthicon. Also disclosed is a UV laser television system.

5 Claims, 17 Drawing Figures

CLEAR AIR TURBULENCE DETECTION

BACKGROUND OF THE INVENTION

This patent application is a continuation-in-part of U.S. patent application Ser. No. 058,505 filed on July 18, 1979 now U.S. Pat. No. 4,303,862.

The present invention relates to electro-optical detecting systems more particularly to systems for detecting clear air turbulence and/or wake vortex.

The phenomenon of clear air turbulence is generally regarded as one of the more significant problems to be solved in the field of aviation. Such turbulence is dangerous not only because of its potential severity but also because it occurs without warning in cloudless regions where flight crews may have relaxed in the expectation of stable flying conditions.

Many techniques and systems have been utilized in an attempt to detect clear air turbulence. These include acoustics, optical stellar scintillation detection, microwave scintillation of radio, star and satellite beacons, infrared and microwave backscatter, tropospheric bistatic radio scatter, ultrasensitive radar and the measurement of doppler shifts of backscattered return from atmospheric parcels subjected to short pulses of laser radiation.

The known systems have known disadvantages. Microwave systems generally require large antennas, making them generally unsuitable for airborne applications. Known optical systems have limited range. Many of the systems are so complex and costly as to make them economically unattractive.

When an aircraft passes through the air, the vortex is in its wake. Obviously energy is imparted from the aircraft to the air to generate the wake. It can be shown that there is a relationship between the vortex circulation velocities and atmospheric conditions that control water vapor droplet growth.

As far as is known, there are no airborne systems for detecting wake vortex.

SUMMARY OF THE INVENTION

The present invention is directed to apparatus and method for monitoring clear air turbulence and/or wake vortex. In one embodiment of the invention, a beam of light from a continuous wave UV laser scans an area on the aircraft's flight path. A photodetector monitors optical radiation backscattered from the area, providing an intensity-controlling signal for a CRT display. Clear air turbulence is indicated by non-uniformities on the display. In another embodiment of the invention, a pair of beams of light from a pair nitrogen gas pulse UV lasers are arranged to converge at a region in front of the aircraft. The backscattered radiation from the region is monitored for turbulent areas by a receiver which includes a photodetector and which is connected to an oscilloscope where the return pulse amplitude is analyzed. Velocity determinations of the air parcel monitored are made by causing the two beams to scan either horizontally or vertically. In still another embodiment of the invention, a pair of beams of light, one from a nitrogen gas UV pulse laser and the other from a blue dye laser are arranged to converge at a region in front of the aircraft. The backscattered radiation is monitored for turbulent regions by a receiver and oscilloscope combination. Velocity determinations of the air parcel monitored are made by causing the two beams to scan vertically. In a further embodiment of the invention which is used to detect and monitor wake vortex (WV) as well as clear air turbulence (CAT), either a nitrogen gas pulse UV laser or a multispectral helium cadium laser is used to generate a light beam which scans an area in front of the aircraft. Backscattered radiation or the presence of wake vortex is detected by a receiver which includes a slaved image orthicon. Also disclosed is a UV laser television system.

DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein like reference numerals represent like parts and wherein:

DETAILED DESCRIPTION

Figure 1:
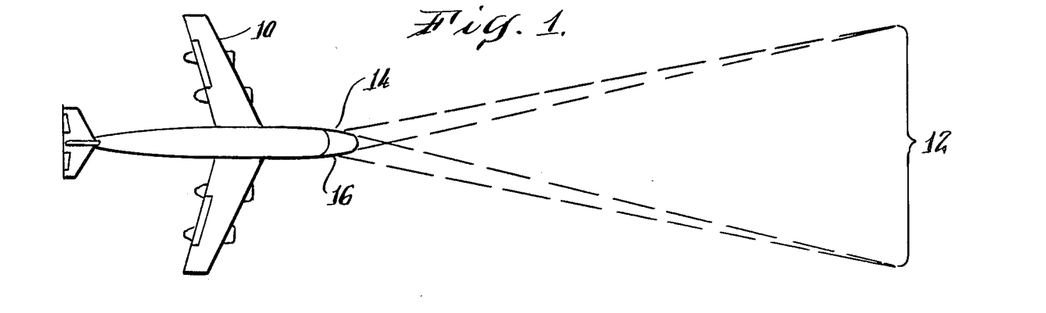
FIG. 1 is a top view of an aircraft showing the area scanned and monitored by an airborne CAT detector constructed in accordance with one embodiment of the present invention.

Referring to FIG. 1, an aircraft 10 traveling along its predetermined flight path includes a unit for scanning a limited area 12 in front of the aircraft. As will be described in more detail later, the scanning is preferably performed by a source of coherent optical radiation indicated to originate at a point 14 on the fuselage of aircraft 10. The coherent radiation is produced by a continuous wave laser which produces optical radiation having a wave length in the ultraviolet region. A certain amount of the laser radiation is backscattered from dust particles in the atmosphere while some will be absorbed by water vapor in the atmosphere.

Clear air turbulence is, at least in part, the result of abnormal levels of water vapor in discrete atmospheric volumes or parcels. The specific heat of water in such an air parcel provides the heat which causes that parcel to lose equilibrium with the surrounding atmosphere. More specifically, parcels having a greater-than-normal amount of water vapor are relatively warmer than the surrounding atmosphere and produce updrafts. Conversely, parcels having less-than-normal amounts of water vapor are cooler than the surrounding atmosphere and produce downdrafts. The rate at which an air parcel with abnormal water vapor content either descends or rises depends on how far from the adiabatic normal lapse rate the given air parcel is.

Optical radiation having a wave length in the ultraviolet range is generally absorbed by water vapor in the atmosphere. Therefore, a measurement of the amount of nonabsorbed ultraviolet radiation will indicate whether a given atmospheric volume contains parcels with abnormal amounts of water vapor; that is, updrafts and downdrafts.

Since optical radiation will be reflected from dust particles in the atmosphere, a detector can be mounted at a location 16 on aircraft 10 to monitor the amount of returning or backscattered radiation from the scanned area. The backor scattered radiation provides an input signal for a display which visually indicates updrafts or downdrafts in the scanned area.

Figure 2:
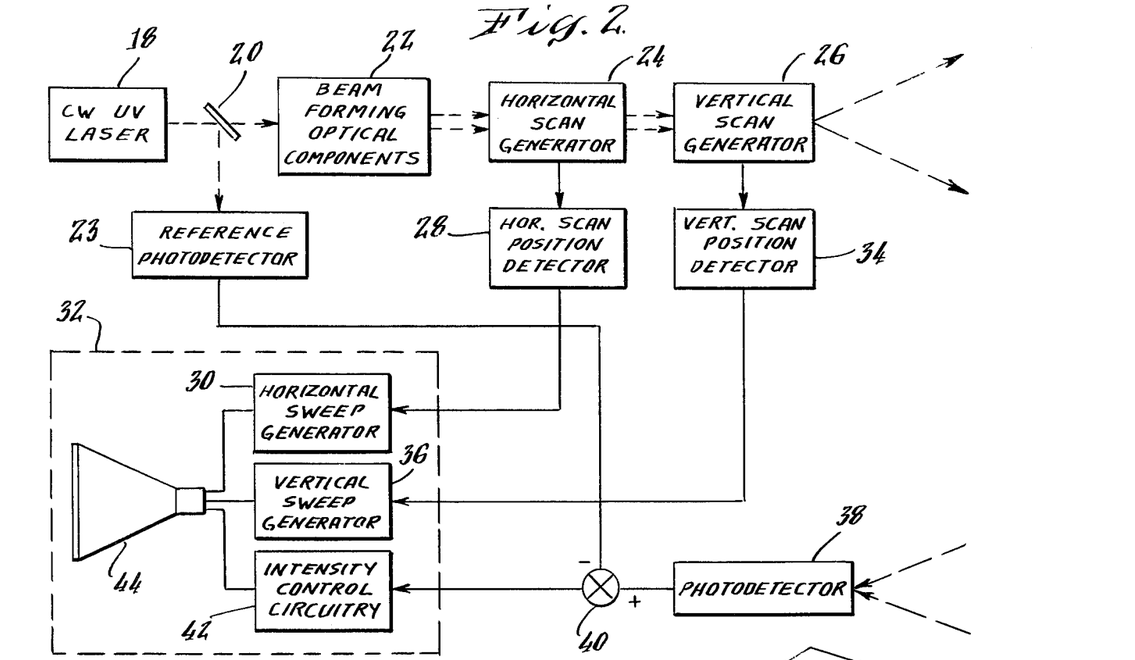
FIG. 2 is a block diagram of a system incorporating the present invention.

FIG. 2 is a block diagram of a system incorporating the present invention. In a preferred embodiment, the system includes a continuous wave laser 18 producing radiation having a wave length in the ultraviolet region. The coherent beam produced by the laser 18 is directed to a beam splitter 20 which directs most of the radiation to beam forming optical components 22 and a small part of the radiation to the reference photodetector 23.

The function of the beam forming optical components 22 is to enlarge the cross section of the beam by a limited amount so that a greater atmospheric area is scanned by the beam at the given time. Conventional optical components may be used.

The beam is then applied to a horizontal scan generator 24 which causes the beam to travel along a horizontal path. The output of horizontal scan generator 24, one embodiment of which will be described later, is applied to a vertical scan generator 26, which imparts a vertical component of movement to the beam during or between horizontal sweeps. The output of the vertical scan generator 26, an embodiment of which will also be described later, is a beam of ultraviolet radiation which sweeps through a given two dimensional area in much the same manner as an electron beam sweeps across the face of a television screen; that is, in a plurality of horizontal sweeps with each horizontal sweep being below the preceding sweep.

The operation of the horizontal scan generator 24 is monitored by a horizontal scan position detector 28 which generates a signal indicating that the beam is at the start of a horizontal scan. This signal is applied to a horizontal sweep generator circuit 30 within a cathode ray tube (CRT) display system 32. Similarly, the operation of the vertical scan generator 26 is monitored by a vertical scan position detector 34 to provide a signal relating to the vertical position of the optical beam. This vertical position signal is applied to a vertical sweep generator circuit 36 in the CRT display system 32.

As discussed above, some of the ultraviolet radiation which is emitted into the atmosphere will be absorbed by water vapor while some will be backscattered toward the aircraft by dust particles in the atmosphere. The backscattered or returning radiation is sensed by photodetector 38 which would be mounted at the position 16 on the aircraft. The photodetector 38, which is conventional in nature, generates an electrical signal having an intensity proportional to the amount of returned optical radiation. Assuming that the distribution of dust particles is relatively uniform throughout the atmospheric volume, the intensity of the electrical signal generated by the photodetector 38 is also inversely related to the amount of water vapor in parcels within the scanned atmospheric volume.

To cancel out the effects of any variation in the output of the laser 18, the output of the photodetector 38 and of the reference photodetector 23 are combined in a summing junction 40. The output of summing junction 40 is applied to an intensity control circuit 42 in the CRT display system 32.

The CRT display system 32, which includes a conventional cathode ray tube 44, operates in much the same manner as any conventional CRT system except that the operations of the horizontal sweep generator circuit 30 and of the vertical sweep generator circuit 36 are synchronized by signals received directly from the horizontal scan generator 24 and the vertical scan generator 26 rather than by information contained in the incoming signal.

The cathode ray tube 44 provides a display in which the intensity at any one point is determined by the amount of optical radiation returned to photodetector 38. Where the atmosphere is stable, the display will have a relatively uniform intensity. In regions having updrafts or downdrafts, the display will have a nonuniform intensity. The exact nature of the nonuniformities is described with reference to later figures.

Figure 3:
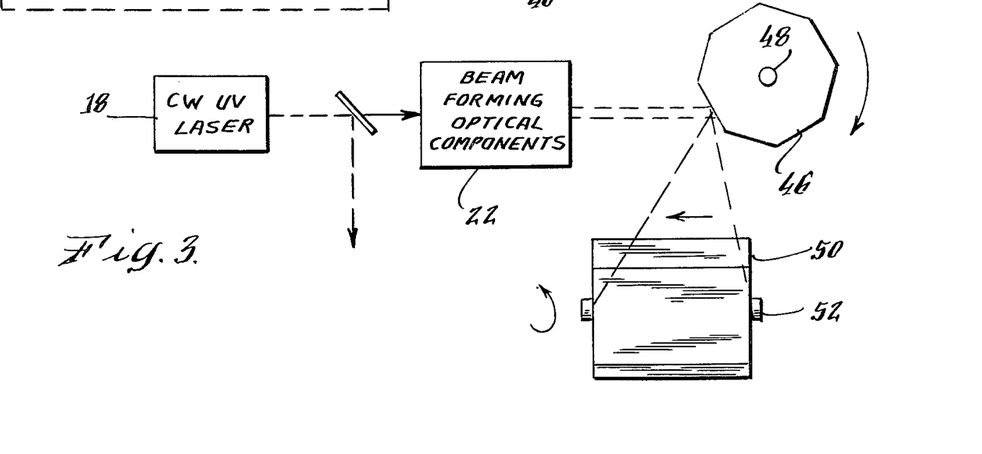
FIG. 3 is a simplified schematic diagram of one type of scan generator system for producing horizontal and vertical deflection of a coherent beam.

Referring first to FIG. 3, however, there is shown one embodiment of a horizontal scan generator and a vertical scan generator for use with the laser 18 and beam forming optical components 22. Horizontal scanning movement is produced by directing the laser beam at a drum 46 which is driven in a clockwise direction about an axis of rotation 48, which is perpendicular to the axis of the laser beam, by an electric motor (not shown). The surface of the drum 46 is made up of reflecting facets or mirrors. As each of the facets moves relative to the laser beam, the beam is reflected as varying angles from the facet surface. The changing angles of incidence (and consequently the changing angles of reflection) cause the beam to travel from right to left in a horizontal plane. This horizontally-traversing beam is directed onto the surface of a second drum 50 having a plurality of faceted reflecting surfaces which is driven about an axis 52, which is parallel to the axis of the laser beam, by another electric motor (not shown). As the drum 50 turns relative to the horizontally-traversing laser beam, the beam will follow successive horizontal or nearly horizontal tracks, each of which falls below the preceding track.

Figure 4:
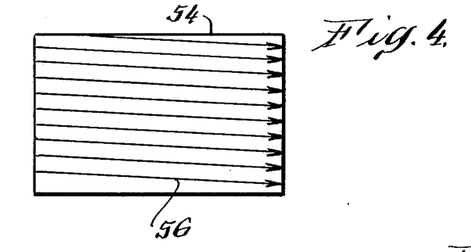
FIG. 4 shows the paths traveled by the scanning coherent beam.

Referring to FIG. 4, the movement of the laser beam produced by the rotation of the drums 46 and 50 is shown. As the drum 46 rotates, the laser beam will scan along horizontal or nearly horizontal lines, such as line 54 from left to right. Each scan line 54 represents the rotational movement of one of the facets of drum 46 past the impinging laser beam. As drum 50 rotates, the repeated horizontal traces follow below one another. The entire vertical field between the topmost horixontal scan line 54 and the bottommost horizontal scan line 56 is generated during the movement of a single facet on drum 50 past the laser beam.

Each of the horizontal traces has a slight downward slope to the right. This is brought about by the movement of the facet on drum 50 during each horizontal trace. If drum 50 were to be stepped through its cycle of rotation in small angular increments rather than continuously rotated, the traces 54 would be made to be completely horizontal. However, the slight vertical movement of the beam during each horizontal trace is not considered significant and a continuous or unstepped drive for drum 50 is preferred because of its simplicity.

Figure 5:
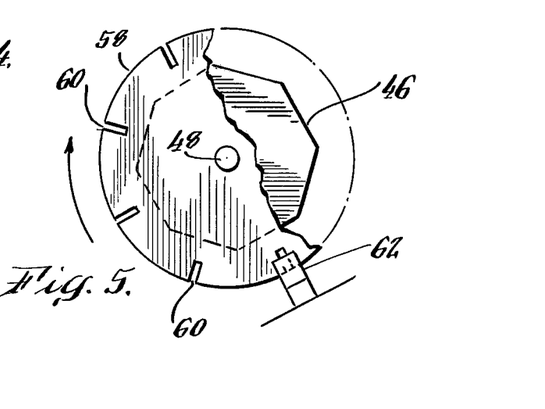
FIG. 5 is a side view of a timing disc which may be used to generate a horizontal sweep synchronizing signal.

FIG. 5 shows a simplified version of one form of horizontal position detector which might be used to control the horizontal scan of the laser beam. A disc 58 is mounted on the shaft 48 about which the first drum 46 rotates. Disc 58 is generally circular but includes a plurality of equally spaced notches 60 at its periphery. Each of the notches is aligned with that point on one of the mirror facets at which the facet causes the beam to begin a new horizontal trace. A photodetector 62 detects the presence of the slot to provide a synchronizing signal to the horizontal sweep generator circuitry for the CRT display.

Figure 6:
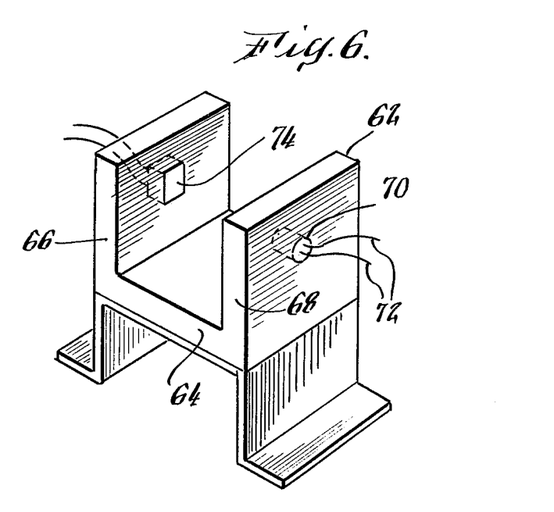
FIG. 6 is a perspective view of one type of photodetector which might be used with the timing disc of FIG. 5.

The photodetector 62 is shown in more detail in FIG. 6. The detector 62 comprises a generally U-shaped block having a base or bight section 64 and upstanding arms 66 and 68. The arms 66 and 68 sit on opposite sides of the disc 58. Arm 68 includes a light source 70 which can be connected to a suitable electric supply through conductors 72. The arm 66 includes a photocell 74. The light path between the light source 70 and the photocell 74 is blocked by the disc 58 except when one of the peripheral slots 60 intervenes. When one of the slots 60 comes into alignment with source 70 and photocell 74, the optical path is completed causing photocell 74 to generate an electrical signal which can be applied to the horizontal sweep generator circuit 30 to cause the electron beam for the cathode ray tube 44 to be deflected to the start position for a new horizontal trace.

Figure 7:
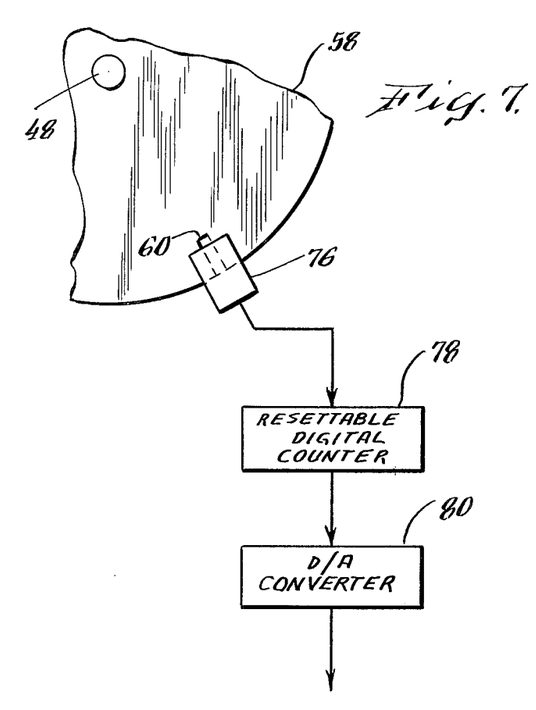
FIG. 7 is a simplified schematic view of circuitry which might be used to control the vertical position of an electron beam.

A synchronizing signal for returning the electron beam to the topmost horizontal scan line on the cathode ray tube 44 may be generated by using the same type of disc and photodetector arrangement with drum 50. However, since there are a large number of horizontal traces in a single vertical field, the vertical position of the laser beam within the field must be indicated by an auxiliary circuit which is triggered by such a photodetector arrangement. Referring to FIG. 7, the output from a photodetector 76 is used to reset a digital counter 78 which counts at a fixed rate proportional to the nominal speed of rotation of the drum 50. The output of digital counter 78 is applied to a digital to analog (D/A) converter 80 which provides a linearly increasing control signal to the vertical sweep generator circuit 36. The magnitude of the signal at the output of the D/A converter 80 controls the vertical position of the electron beam on the cathode ray tube 44. The circuitry causes the electron beam to move vertically downward in increments during scanning. When the photodetector 76 senses a slot in the timing disc, the resetting of digital counter 78 causes the electron beam to return to the topmost position in the field.

Figure 8:
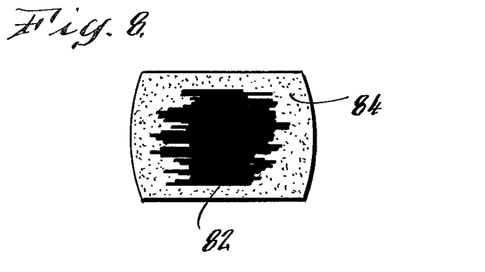
FIG. 8 represents a CRT display depicting an updraft condition.

Referring now to FIG. 8, it was indicated earlier that stable atmospheric conditions produce a CRT display having a relatively uniform intensity since the generally uniform amount of water vapor existing in such an atmosphere causes ultraviolet radiation to be uniformly absorbed. Where the atmosphere contains an excessive amount of water vapor in a given limited volume of parcel, indicative of an updraft, that parcel absorbs more ultraviolet radiation (and returns less) than the surrounding parcels. On the CRT display, this atmospheric condition is indicated by a blank or darker area 82 in an otherwise uniform field 84.

Figure 9:
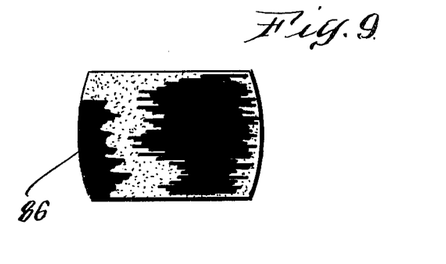
FIG. 9 represents a CRT display showing a downdraft condition.

On the other hand, a downdraft is indicated by a brighter or more intense than normal area, such as the area 86 shown in FIG. 9. This is because the downdraft includes less-than-normal amounts of water vapor so that less ultraviolet radiation will be absorbed and more will be returned.

Figure 10:
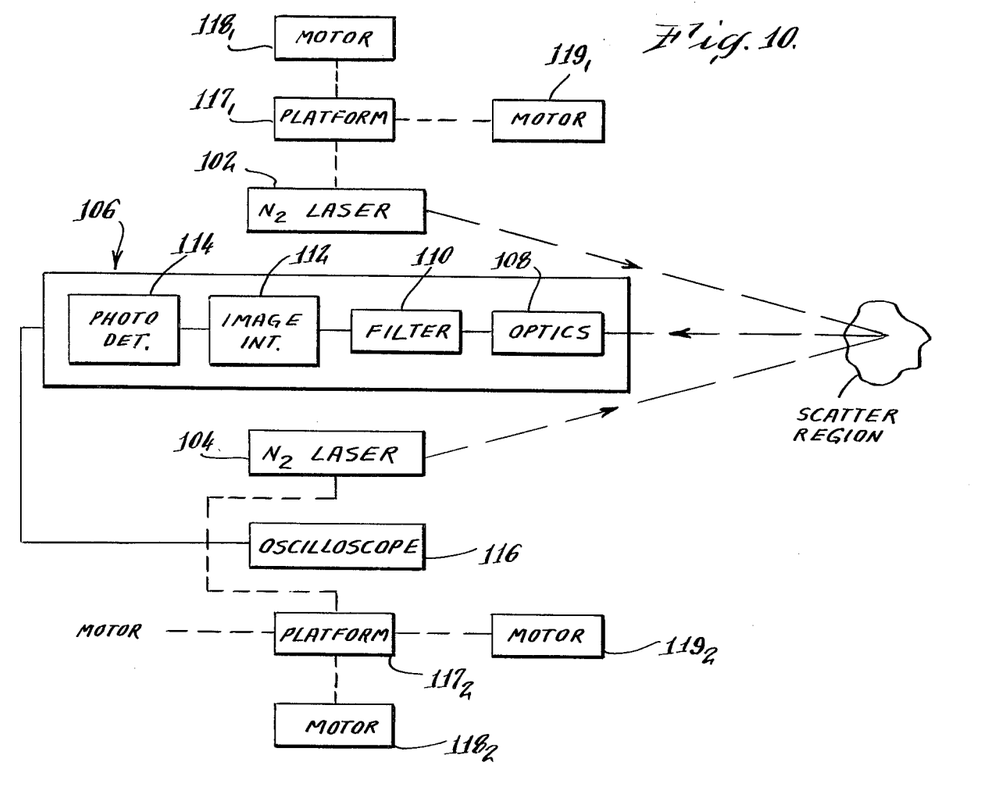
FIG. 10 is a block diagram of a CAT detector constructed according to a second embodiment of the invention.

Referring now to FIG. 10, there is illustrated a block diagram second embodiment of an airborne CAT detector constructed according to the invention. The CAT detector includes two synchronizer nitrogen gas ultraviolet lasers 102 and 104. These lasers emit at 3371A with a pulse width of approximately 1.5 nanoseconds and a repetition rate of 800 pulse/sec.

Figure 11:
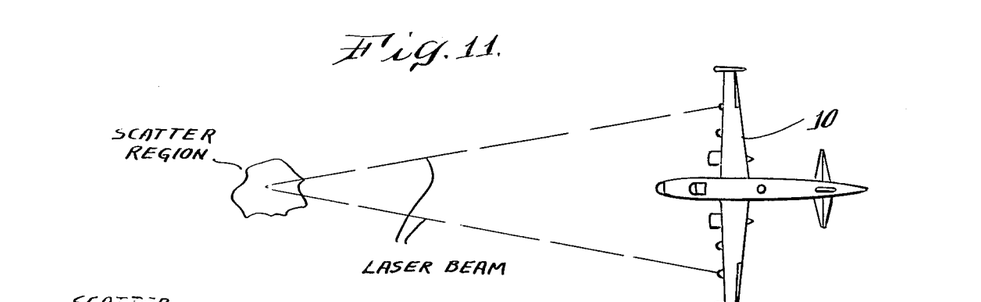
FIG. 11 is a top view of an aircraft showing the area monitored by an airborne CAT detector constructed according to the second embodiment of the invention.

Lasers 102 and 104 are set to converge at some point in front of the aircraft. (FIG. 11) The ultraviolet radiation is backscattered from that area of space in accordance with the scattering paramters as defined by Rayleigh and Mie. This type of scattering, particularly Mie, is highly dependent on the radii of the aerosols in the scattering region. The radii dependence of the scattering can therefore detect and map variations in aerosol radii along a path that the aircraft 10 is about to fly. Because air parcels moving upward or downward are thermodynamically unstable, the water vapour and droplets within that air parcel will be changing in radii. Therefore a rapid change in the aerosol size would indicate an air parcel that is unstable.

Figure 12:
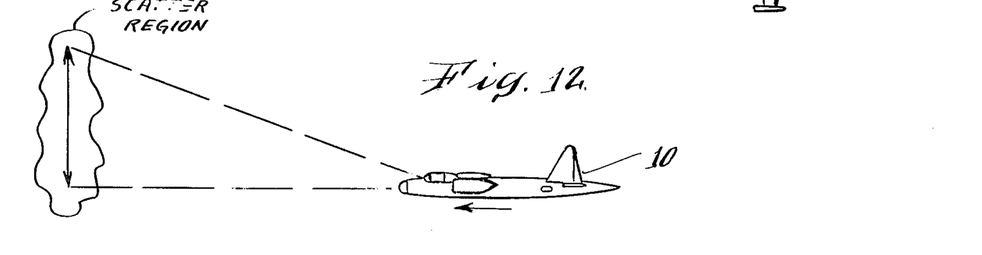
FIGS. 12 and 13 are front and top views respectively showing vertical and horizontal scanning for the detector system shown in FIG. 10.
Figure 13:
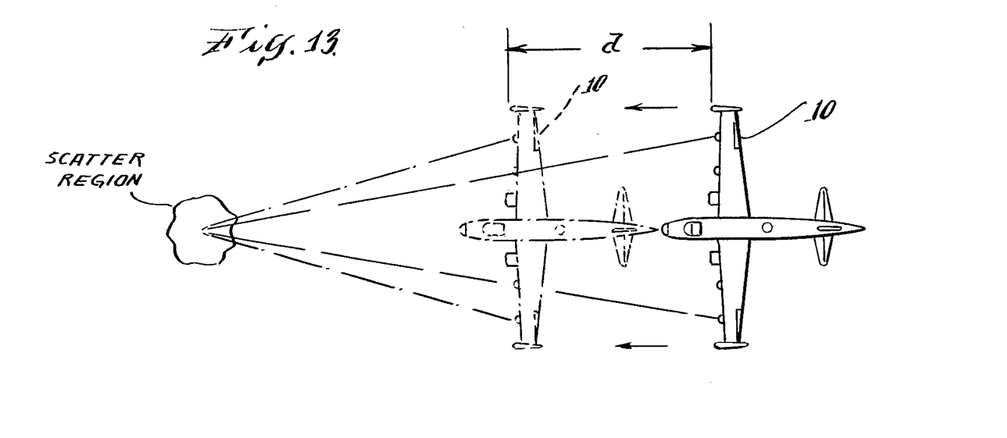

A velocity determination of that air parcel can be made by "watching" that region by vertically scanning (FIG. 12) or by a horizontal scan (that would be dependent on aircraft airspeed). (FIG. 13) Either method allows one to observe the air mass over several seconds (either directly in time by the horizontal scan or by picking points in the air parcels evolution by vertical scan). Either scanning procedure will detect variations in the aerosol sizes over the region scanned by the variations in the scattered radiation. Since aerosol size variations are directly related to the vertical motions of the air parcel, a velocity determination could be made.

The receiver portion 106 of the detector is a simple optical system 108 focusing on that region of space that the lasers are focused on, with suitable filters 110, an image intensifying tube 112, and a photodetector 114. Receiver 106 is tied in to an oscilloscope 116 where the return pulse amplitude is analyzed.

Vertical and horizontal scanning of the lasers may be achieved optically or mechanically. Thus, lasers 102 and 104 may be mounted on platforms $117_1$, and $117_2$ respectively, which can be rotated about their vertical axis by motors $118_1$ and $118_2$ to achieve horizontal scanning and rotated about their horizontal axis normal to the longitudinal axis of the aircraft by motors $119_1$ and $119_2$ to achieve vertical scanning.

Figure 14:
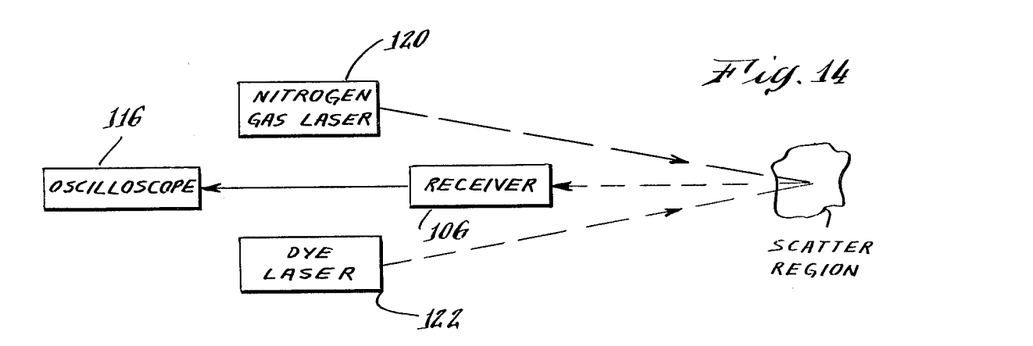
FIG. 14 is a block diagram of the detector in a third embodiment of the invention.

Referring now to FIG. 14, there is shown a block diagram of a detector for measuring clear air turbulence using a multi-spectral laser system. By measurement of the backscattered radiation from both an ultraviolet and a blue laser aerosol concentrations ranging in size from 0.05 micrometers to approximately 3 micrometers can be measured.

As an aerosol varies in size from $0.05\mu$ to $3\mu$ the degree of backscatter varies in accordance with the Mie function. By using a multi-spectral approach, a comparison of the individual backscattered radiations, it is possible to reference the point of the Mie function that is producing the backscattered radiation characteristics and therefore the particle size in the region in question.

By observing a particular column of air it is therefore possible to measure changes in aerosol diameters within that column. When such columns of air are stable there is little variance of aerosol diameters. However, if the air column is unstable, moving either upward or downward, the air mass will release or absorb thermal energy from the surrounding air mass. This additional energy (positive or negative) will control the growth rate of aerosols within the unstable air mass. Therefore, in a vertical column that is a section of the unstable air mass, it is possible to observe the variations in the aerosol diameters by the changing backscattered radiation.

The rate of change of the aerosol diameters, which produces a change in the radiation backscatter, is directly related to the velocity of the air mass as compared to the surrounding more stable air.

The system includes a nitrogen gas pulsed laser 120 which emits light in the ultraviolet region and an organic dye laser 122 which emits light in the blue region. Examples of dyes which emit light in the blue region are cabostyrid 165, coumarin 120, coumarin 2,7 diethylamino 4 methylcoumarin, coumarin 102, coumarin 7 and coumarin 6. Dye laser 122 is optically pumped using some of the light emitted by the nitrogen gas laser 120. The system is mounted on the aircraft as in the FIG. 11 embodiment. Backscattered radiation is detected by a receiver 106 connected to an oscilloscope 116 of the same type as in the second embodiment.

Figure 15:
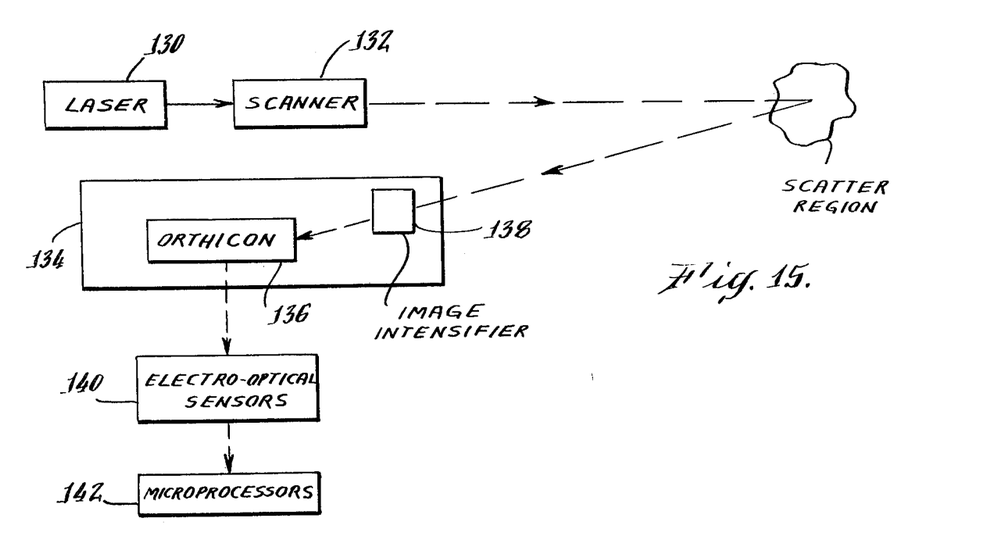
FIG. 15 is a block diagram of the detector in a fourth embodiment of the invention.

Referring now to FIG. 15, there is shown a block diagram of a fourth embodiment of the invention for use in detecting clear air turbulence and/or wake vortex.

Since a wake vortex has an energy balance different from the surrounding ambient atmospheres, the physics that controls aerosol water vapour growth under clear air turbulence conditions also controls the water vapour droplet growth in the wake vortex. Thus an ultraviolet laser system can not only detect the presence and location of the vortex but also thru multi-spectral analysis can determine the circulation velocity of the vortex.

Figure 16:
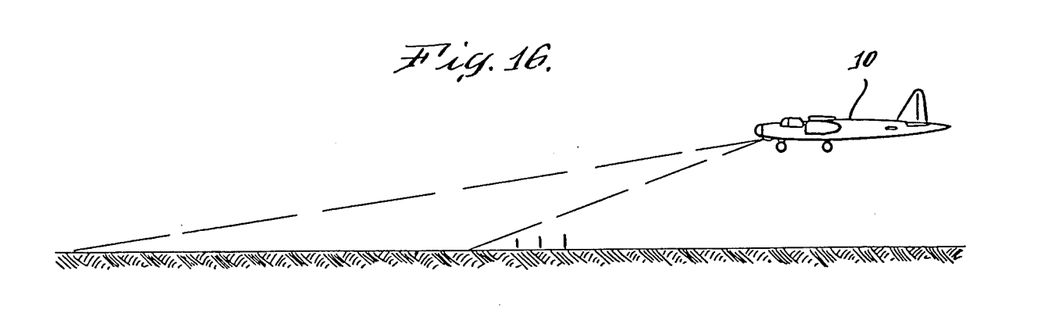
FIG. 16 is a front view of an aircraft showing how the detector in the fourth embodiment is used for detecting wake vortex.

The system includes a laser 130, which is either a nitrogen gas pulse UV laser or a helium-cadmium laser which emits a beam of light in the blue as well as a beam of light in the UV. The laser 130 is located on the aircraft 10 as in the FIG. 1 embodiment and the output beam is caused to scan a vertical region in front of the aircraft using any conventional scanning mechanism 132. If only the presence of CAT or wake vortex is desired, laser 130 may be either a nitrogen gas pulse UV laser or the helium cadmium laser. On the other hand, if velocity determinations are desired, the laser used is the helium cadmium laser. When being used for wake vortex detection, the scanning is as shown in FIG. 16. The receiver portion 134 of the system which receives the backscattered radiation includes a filtered scanning image orthicon 136 and an image intensifier 138. If velocity determinations are desired, the receiver system further includes a plurality of electro-optical sensors 140 coupled to microprocessors 142. When being used for CAT detection, the system is arranged to scan vertically in front of the aircraft.

Figure 17:
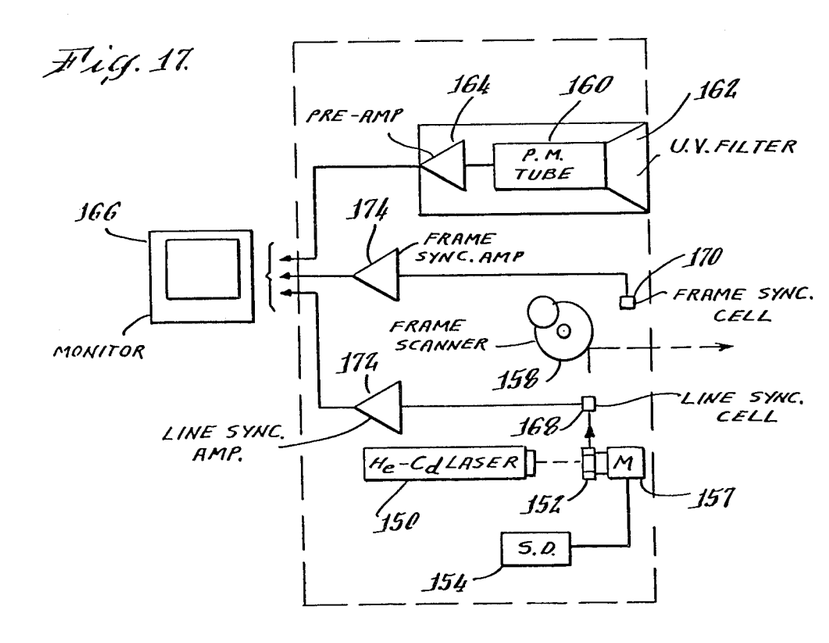
FIG. 17 is a block diagram UV laser television system.

Referring now to FIG. 17, there is shown a block diagram of a UV laser television system which may be used on a flying aircraft for monitoring CAT and WV and in other applications for a variety of purposes.

The laser television system requires no external source of illumination, since the imaging is accomplished by a rapidly moving beam of a laser. Unlike conventional TV cameras, the laser system does not use an image orthicon tube or vidicon and does not require imaging receiver optics. The laser transmitted and receiver are both contained in a single unit. The level of the laser illumination is undetectable by the eye and well below the level that might endanger the vision of humans.

The system matches commercial TV quite closely in line rate (15,750 per second) and frame rate (60 per second, noninterlaced) and would be of comparable picture quality with a resolution of about 1.5 milliradians.

A 3250 A ultraviolet beam from a continuous wave He-Cd metal vapour laser 150 is folded onto a 16-sided polygonal scanner 152 which is driven by a motor 157 controlled by a scanner driver 154. This scanner, rotating slightly under 60,000 rpm, scans the beam in a straight line onto a second scanner 158. This second scanner 158 is the frame scanner and is a 24-sided polygonal drum rotating at 150 rpm. The two scanners yield a raster with a 3/2 (45/30) aspect ratio, and the conventional TV rates of 15,750 lines per second and 60 frames per second mentioned above. The transmitted laser power is 50 milliwatts in a 1.5 milliradian beam. The instantaneous reflections from the scanned field are received by a photomultiplier 160 after passing through a spectral filter 162, black glass 500 A wide. The output of the photomultiplier 160 is therefore a video signal that is then amplified in an amplifier 164 and presented directly to the video input of a TV monitor 166 for modulation of the electron beam. Synchronization of the monitor raster is obtained with a pair of silicon photodiodes 168 and 170. One, diode 168, is placed at the beginning of the line scan between the two scanners, while the other diode 170 is placed after the frame scanner, at the start of the frame scan. The pulses from these photodiodes are amplified by amplifiers 172 and 174 and then used to drive the scanning circuits (not shown) of the monitor 166.

The lack of any imaging optics in this TV system is quite evident, and it is the non-imaging nature of the system that leads to many interesting properties.

First, the system has an essentially infinite depth of focus. Objects at any distance from the camera will be in focus, with resolution determined by the divergence or spot size of the transmitted beam.

A second effect of the non-imaging characteristic is that light sources in the field of view are not imaged. Instead, they appear as a gray level or "noise" level on the screen. Thus, if a match or cigarette lighter is held in the field of view, the smoke will be seen on the screen, but not the flame. The noise level is, of course, determined by the amount of radiation in the 500 A band at 3250 A which can pass through the spectral filter. Further filtering of the received signal, such as spatial filtering by means of an image dissector tube or a mechanically scanned receiving aperture, would make this system operable at all illumination levels.

A third property of the system is the fact that as far as the appearance of the picture on the monitor is concerned, the position of the laser-transmitter is equivalent to the position of the eye (or camera), and the position of the phototube receiver is equivalent to that of a single illumination source in normal viewing with the eye. In other words, by varying the position of the photodetector, various "lighting" effects may be achieved. Further advantage of this property might be taken by techniques such as employing two or more detectors simultaneously to eliminate shadows. In the case of wake vortices, switching from one detector to another would appear to light the vortex from a different direction, thereby improving the visability of the vortex.

Several unique applications result from the ability of the system to detect cooperative (retroreflective) targets. Since nitric oxide is retroreflective, it will show up strongly against a diffuse background of asphalt or concrete. The system could also be used as an all weather low-light aid, since the numbers and lines on the runway could be made reflective, thereby showing up strongly on the cockpit monitor.

While there has been described what is considered to be preferred embodiments of the invention, variations and modifications therein will occur to those skilled in the art once they become acquainted with the basic concepts of the invention. Therefore, it is intended that the appended claims shall be construed to include all such variations and modifications as fall within the true spirit and scope of the invention.

What is claimed is:

1. A system for use in an aircraft for detecting clear air turbulance along the aircraft's flight path comprising:
   a. a pair of pulse lasers for generating a pair of coherent beams arranged to converge at a point in front of the aircraft's flight path,
   b. receiver means for detecting backscattered radiation produced at said point by said beams and for producing electrical signals related thereto, and
   c. display means for displaying said signals.
2. The system of claim 1 and wherein the two lasers are nitrogen gas lasers.
3. The system of claim 1 and wherein one of the lasers is a nitrogen gas laser and the other laser is a dye laser.
4. The system of claim 1 and further including means for causing said pair of beams to scan at their point of convergence in a horizontal direction.
5. The system of claim 1 or 4 further including means for causing said pair of beams to scan at their point of convergence in a vertical direction.

* * * * *